(12) United States Patent
Wojcik

(10) Patent No.: US 11,074,353 B2
(45) Date of Patent: Jul. 27, 2021

(54) BLOCKCHAIN UNIVERSAL RFID TRANSLATOR

(71) Applicant: International Business Machines Corporation, Armonk, NY (US)

(72) Inventor: Marci R. Wojcik, Grand Blanc, MI (US)

(73) Assignee: International Business Machines Corporation, Armonk, NY (US)

( * ) Notice: Subject to any disclaimer, the term of this patent is extended or adjusted under 35 U.S.C. 154(b) by 515 days.

(21) Appl. No.: 16/012,998

(22) Filed: Jun. 20, 2018

(65) Prior Publication Data

US 2019/0392159 A1 Dec. 26, 2019

(51) Int. Cl.
*H04L 29/06* (2006.01)
*G06F 21/62* (2013.01)
*G06K 7/10* (2006.01)
*G06F 40/40* (2020.01)

(52) U.S. Cl.
CPC .............. *G06F 21/62* (2013.01); *G06F 40/40* (2020.01); *G06K 7/10297* (2013.01)

(58) Field of Classification Search
CPC ............................ G06F 21/62; G06K 7/10297
See application file for complete search history.

(56) References Cited

U.S. PATENT DOCUMENTS

| 6,768,931 | B2* | 7/2004 | Takehara | G06Q 10/08 414/140.3 |
| 7,181,312 | B2* | 2/2007 | Takehara | G06Q 10/08 414/137.1 |
| 9,378,206 | B2 | 6/2016 | Snyder et al. | |
| 9,569,771 | B2 | 2/2017 | Lesavich et al. | |
| 2017/0330143 | A1* | 11/2017 | Raghavan | G06F 40/106 |
| 2018/0144298 | A1* | 5/2018 | Rankin | H04L 9/34 |
| 2018/0174097 | A1* | 6/2018 | Liu | H04L 9/3239 |
| 2018/0211202 | A1* | 7/2018 | Ynion, Jr. | G06Q 20/12 |
| 2018/0218033 | A1* | 8/2018 | Utla | G06Q 30/02 |
| 2018/0220278 | A1* | 8/2018 | Tal | G06Q 20/065 |
| 2019/0296895 | A1* | 9/2019 | Banks | G06Q 10/0838 |

(Continued)

FOREIGN PATENT DOCUMENTS

EP 2397868 A1 * 12/2011 ............ H04W 12/06

OTHER PUBLICATIONS

Anonymously; "A Method and System for Mobile Phone Enabled Context-Aware RFID Data Management"; http://ip.com/IPCOM/000240389D; Jan. 28, 2015.

(Continued)

*Primary Examiner* — Phy Anh T Vu

(57) ABSTRACT

An example operation may include one or more of: receiving, via an input/output interface, an encrypted RF signal from an RF identification device; decrypting, via a processing unit, the received encrypted RF signal to generate decrypted data; modifying, via the processing unit, the decrypted data to generate modified data; maintaining, via a memory, a cryptographic distributed ledger based on the decrypted data and the modified data; encrypting, via the processing unit, the modified data to generate encrypted data; updating, via the memory, the cryptographic distributed ledger based on the encrypted data; and transmitting, via the input/output interface, an updated encrypted RF signal, based on the encrypted data, to the RF identification device.

12 Claims, 9 Drawing Sheets

(56) References Cited

U.S. PATENT DOCUMENTS

2019/0384842 A1* 12/2019 Rao .................. G06F 16/27
2020/0183917 A1* 6/2020 Duchastel ........... G06F 16/2379

OTHER PUBLICATIONS

Anonymously; "Simplify Cloud Data Access through a Central Database Driver Management Service called UDI (Universal Data Integrator)"; http://ip.com/IPCOM/000246864D; Jul. 8, 2016.
Goldwater, JC.; "The Use of Blockchain to Foster the Development of Patient-Reported Outcome Measures"; National Quality Forum; Aug. 8, 2016.

* cited by examiner

BLOCKCHAIN UNIVERSAL RFID TRANSLATOR

TECHNICAL FIELD

This application generally relates to electronically managing a supply chain, and more particularly, to a blockchain universal RFID translator.

BACKGROUND

A ledger is commonly defined as an account book of entry, in which transactions are recorded. A distributed ledger is ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. A blockchain is a distributed database that maintains a continuously-growing list of records in the blockchain blocks, which are secured from tampering and revision due to their immutable properties. Each block contains a timestamp and a link to a previous block. A blockchain can be used to hold, track, transfer and verify information. Since a blockchain is a distributed system, before adding a transaction to the blockchain ledger, all peers need to reach a consensus status.

Conventionally, commercial shipping has used radio frequency identification (RFID) technology to track shipped items. RFID uses electromagnetic fields to identify and track tags attached to objects. The RFID tags contain data associated with the objects, for which they are respectively attached. During transit, an RFID tag may be "read" by an RFID tag reader to obtain the information about the object for which the tag is attached.

In a conventional shipping system an item to be shipped may have an RFID tag thereon, wherein the RFID tag includes information of the item. Such item information may include, item origin, item destination, item manufacturer and so on. This RFID tag may be used to track the item as it is shipped from its origin, through any way stations and on to its final destination.

However, a problem with conventional commercial RFID shipping systems is that items may be swapped with counterfeit items having associated counterfeit RFID tags. The swapped out authentic items may then be misappropriated, for example on the black market.

Further when shipping internationally, RFID data is usually coded in the language of origin of the supplier or manufacturer. When passing through a waypoint, the RFID tag is typically scanned (read) by a RFID reader to obtain the information therein. However, if the country of the waypoint uses a different language from the origin of the supplier or manufacturer, or even a previous waypoint, then the scanned data must be translated. Translators exist, but are usually either physical devices or manual process for translating the scanned RFID data. As such, what is needed is a secure system that can track RFID data and a system than can translate the surely tracked RFID.

SUMMARY

One example embodiment may provide a method that includes one or more of: receiving, via an input/output interface, an encrypted RF signal from an RF identification device; decrypting, via a processing unit, the received encrypted RF signal to generate decrypted data; modifying, via the processing unit, the decrypted data to generate modified data; maintaining, via a memory, a cryptographic distributed ledger based on the decrypted data and the modified data; encrypting, via the processing unit, the modified data to generate encrypted data; updating, via the memory, the cryptographic distributed ledger based on the encrypted data and transmitting, via the input/output interface, an updated encrypted RF signal, based on the encrypted data, to the RF identification device.

Another example embodiment may provide a system that includes: an input/output interface operable to receive an encrypted RF signal from an RF identification device; a processing unit operable to decrypt the received encrypted RF signal to generate decrypted data and to modify the decrypted data to generate modified data; and a memory operable to maintain a cryptographic distributed ledger based on the decrypted data and the modified data, wherein the processing unit is further operable to encrypt the modified data to generate encrypted data, wherein the memory is further operable to update the cryptographic distributed ledger based on the encrypted data and wherein the input/output interface is further operable to transmit an updated encrypted RF signal, based on the encrypted data, to the RF identification device.

A further example embodiment may provide a non-transitory computer readable medium comprising instructions, that when read by a processor, cause the processor to perform one or more of receiving, via an input/output interface, an encrypted RF signal from an RF identification device; decrypting, via a processing unit, the received encrypted RF signal to generate decrypted data; modifying, via the processing unit, the decrypted data to generate modified data; maintaining, via a blockchain cryptographic distributed ledger security ecosystem, a cryptographic distributed ledger based on the decrypted data and the modified data; encrypting, via the processing unit, the modified data to generate encrypted data; updating, via the memory, the cryptographic distributed ledger based on the encrypted data and transmitting, via the input/output interface, an updated encrypted RF signal, based on the encrypted data, to the RF identification device.

DETAILED DESCRIPTION

Figure 1:
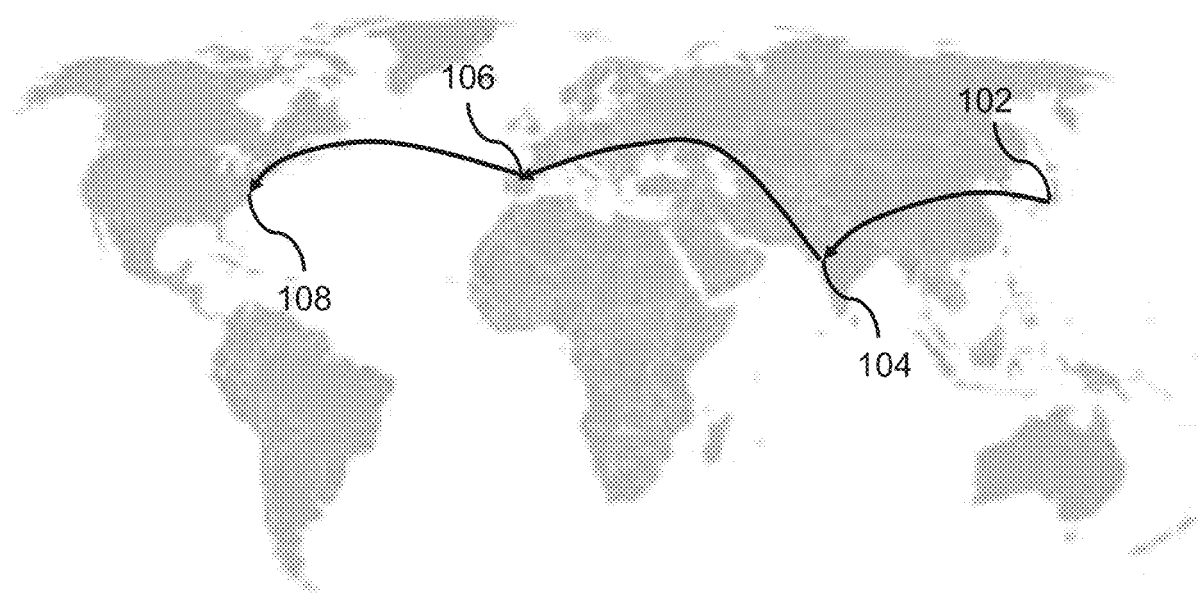
FIG. 1 illustrates a map of the world and a chain of custody of a shipped item.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, non-transitory computer readable media, devices, and/or networks, which provide a blockchain universal RFID translator.

A blockchain is a distributed system, which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions, which are not endorsed, are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node, which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction, which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain), which is used to store an immutable, sequenced record in blocks. The ledger also includes a state database, which maintains a current state of the blockchain. There is typically one ledger per channel. Each peer node maintains a copy of the ledger for each channel of which they are a member.

A chain is a transaction log, which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

The example embodiments are directed to methods, devices, networks and/or systems, which support a blockchain system that includes a universal RFID translator. Some of the benefits of such a system provide a technical solution where a gap in the art exists. A non-limiting example benefit of such a system is that a blockchain system that includes a universal RFID translator solves a technical problem by extending the current blockchain security workflows to include RFID universal location (waystation) based translation records and end of flight delivery resolution records stored on the blockchain.

A blockchain RFID universal translator system in accordance with aspects of the present invention creates and sustains verifiable and indisputable RFID digital transactions translated by current location of the RFID chip as well as translated on demand for an input location. When an RFID location digital transaction is carried out, it is translated and stored in a cryptographically protected "block," governed by rules defined by a governing body, such as an industry consortium, or a predetermined group of member.

In a blockchain RFID universal translator system in accordance with aspects of the present invention, a cryptographic trust services component of a blockchain platform is modified to include an RFID universal translator component. Accordingly, the system provides the following features: protection from system administrators; tamper protection by disabling all external interfaces that provide logically partitioned memory access; and all code and data that is stored is encrypted at all times by using an encryption layer Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the inclusion of RFID universal location (waystation) based translation records and end of flight delivery resolution records stored on the blockchain is implemented due to immutability, security, smart contract, privacy, distributed and consensus attributes, which are inherent and unique to blockchain.

In particular, with respect to the immutability aspect, RFID becomes immutable as it is translated in the SSC (Secure Service Container) of the Blockchain and is stored in the blockchain ledger.

With respect to the security aspect, RFID data is encrypted from specialized scanner software at the waystation, securely transmitted via https to the blockchain, unencrypted and translated by the SSC RFID translator component, and then re-encrypted and stored as an immutable record in the blockchain. This invention promotes accountability as each shipping/receiving weigh station creates a transaction record from the RFID scan, translated into the local language, and stored as an immutable record in the blockchain. At its final destination (the receiving station), the terminal endpoint scan executes the normalization process (MED—minimal essential description) process, that reviews each waypoint blockchain record and normalizes the result to 0. This guarantees that each waypoint has properly recorded essential details, days, times, weights and location in the local language and this agrees both with the shipped and received information accordingly in the local language.

With respect to the smart contract aspect, the RFID ledger record automatically translates and records RFID location information at each waystation during the shipped item in flight. The recorded transactions represent the state of the shipped product and form a chain of custody that fulfills the contract between supplier and buyer to deliver authentic and verified goods through regular shipping and receiving channels.

With respect to the privacy aspect, the RFID data is encrypted once again after the language translation happens in the SSC and stored on the blockchain.

With respect to the distributed aspect, RFID Scanner software is loaded and resident on each scanner to provide the capability of transmitting RFID transaction data to the blockchain. Each in flight waystation will use these software equipped scanners and allow decentralized and distributed blockchain transaction creation to occur.

With respect to the consensus aspect, each participating transit waystation as well as the supplier and consumer would agree upon the content, format and legal representation required to form a viable chain-of-custody for shipped items using this system.

One of the benefits of the example embodiments is that it improves the functionality of a computing system by ensuring immutability. In particular, it is not possible to ensure immutability in traditional databases due to administrator access to the database records. Blockchain prevents even administrator write access to an already stored record where the record becomes immutable in the Blockchain's SSC. Through the blockchain system described herein, a computing system can perform functionality because it provides a functional improvement in the area of blockchain security for RFID data during each in flight waypoint as well as the point of shipping and receiving. Significant gains are made in the provenance of the RFID data as the waypoint data is translated in the country of origin and resolved at the end of the shipping and receiving process for each tracked item.

Overall, a blockchain RFID universal translator system in accordance with aspects of the present invention enables a "chain of custody" on all cryptographic distributed ledger RFID artifacts as they propagate a supply chain.

The example embodiments provide numerous benefits over a traditional database. For example, through the blockchain the embodiments provide a solution to a technical problem by extending the current blockchain security workflows to include RFID universal location (waystation) based translation records and end of flight delivery resolution records stored on the blockchain.

Meanwhile, a traditional database could not be used to implement the example embodiments because a traditional database does not enable immutable security on a chain of custody. Accordingly, the example embodiments provide improved processing and security as blockchain transactions are stored in highly cryptic and precise encoded formats. This greatly reduces bulk during transmission and storage of each waypoint transaction. This results in greater network speed and reduced latency for each transaction as well as the overall network performance.

Conventionally, commercial shipping has used radio frequency identification (RFID) technology to track shipped items. RFID uses electromagnetic fields to identify and track tags attached to objects. The RFID tags contain data associated with the objects, for which they are respectively attached. During transit, an RFID tag may be "read" by an RFID tag reader to obtain the information about the object for which the tag is attached.

In convention supply chain systems, data in-flight during RFID movement and data translation can be altered, viewed, copied and otherwise tampered with. Accordingly, a conventional system to track data in-flight during RFID movement prevents a true Chain of Custody from forming, and need to be handled.

A blockchain platform in accordance with aspects of the present invention creates verifiable Supply-Chain wide secure digital transactions including RFID translations.

A blockchain RFID universal language translator system and method in accordance with aspects of the present invention create and sustain verifiable and indisputable RFID digital transaction translated by a current location of the RFID chip as well as translated on demand for any input location. When an RFID location digital transaction is carried out, it is translated and stored in a cryptographically protected "block," governed by rules defined by a governing body, such as an industry consortium, or a pre-determined group of members.

A cryptographic trust services component provides an encapsulated operating system, encrypted appliances, tamper protection, protected memory and strong logical partitions that can be configures to match EAL5+ certification, which is an international evaluation assurance level.

Key security features of a blockchain RFID universal language translator system and method in accordance with aspects of the present invention included: protection for system administrators; tamper protection—in example embodiments, an image boot loader is signed to ensure that it cannot be tampered or exchanged with a different image boot loader; encrypted appliance disks—all code and data stored on disk is encrypted at all times by using an encryption layer, for example a Linus encryption layer; an encapsulated operating system; protected Internet Protocols; and embedded monitoring and self-healing.

RFID location based translation and validation of RFID data enables the "chain of custody" on all CDL RFID artifacts as they propagate the supply chain. This will be described in greater detail with reference to FIG. 1.

FIG. 1 illustrates a map of the world and a chain of custody of a shipped item. In the figure, an item (not shown) originates in Osaka, Japan, designated by origin point 102; is shipped by air to Mumbia, India, designated by way station point 104; is then shipped by air to Barcelona, Spain, designated by way station point 106; and is finally shipped by air to a final destination of New York, USA, designated by destination point 108.

In accordance with aspects of the present invention, the chain of custody of an item being shipped may be tracked and authenticated using a blockchain platform. Further, the language of the RFID data may be translated at each way station point and destination point within the blockchain platform.

Figure 2A:
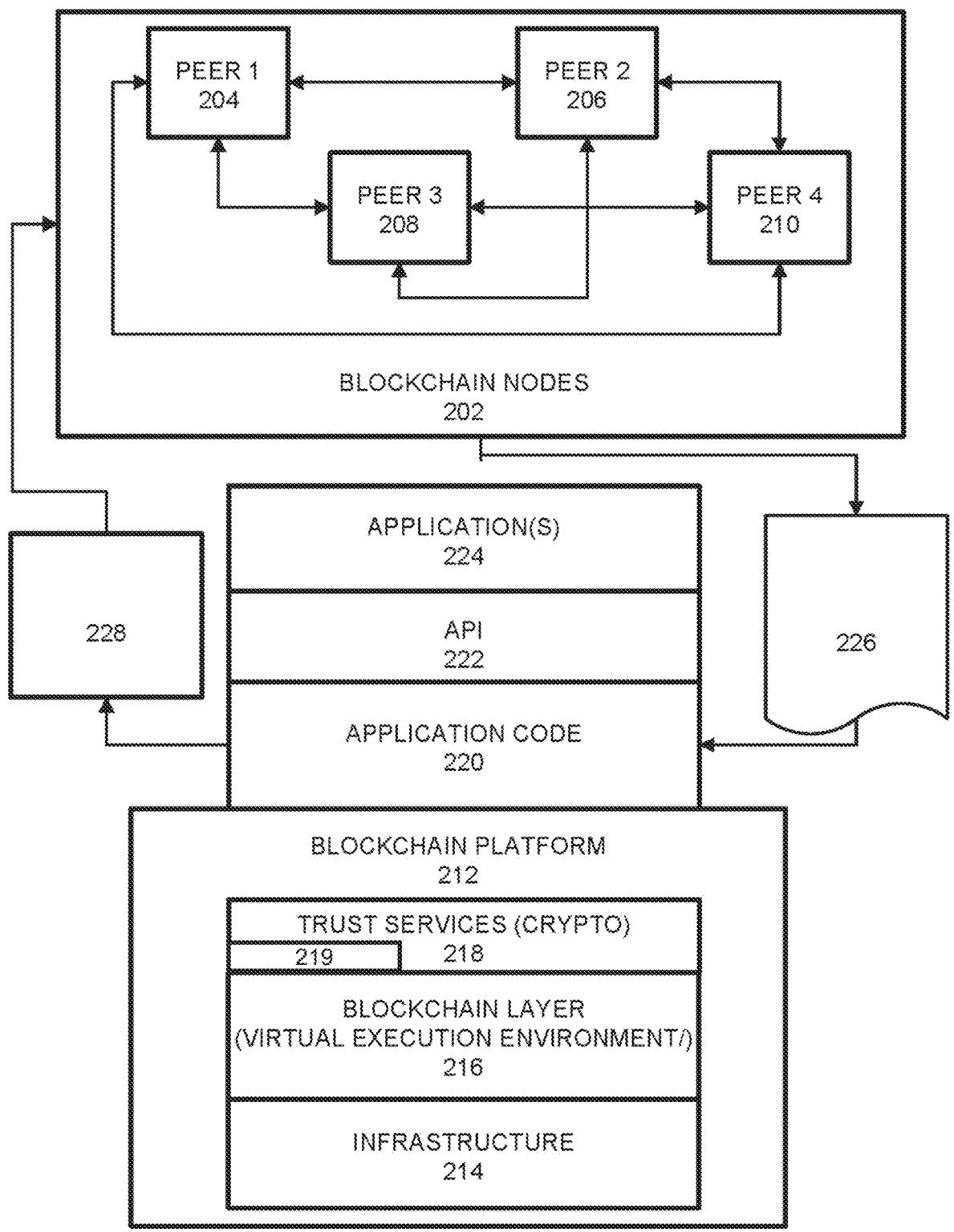
FIG. 2A illustrates an example peer node blockchain architecture configuration for an asset sharing scenario, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210. (4 nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, original language shipping information 226 may be processed by one or more processing entities (e.g., virtual machines) included in the blockchain layer 216. The translated language shipping information result 228 may include the shipping information from original language shipping information 226, as translated by translating component 219 within cryptographic trust services 218. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain.

The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

Figure 5:
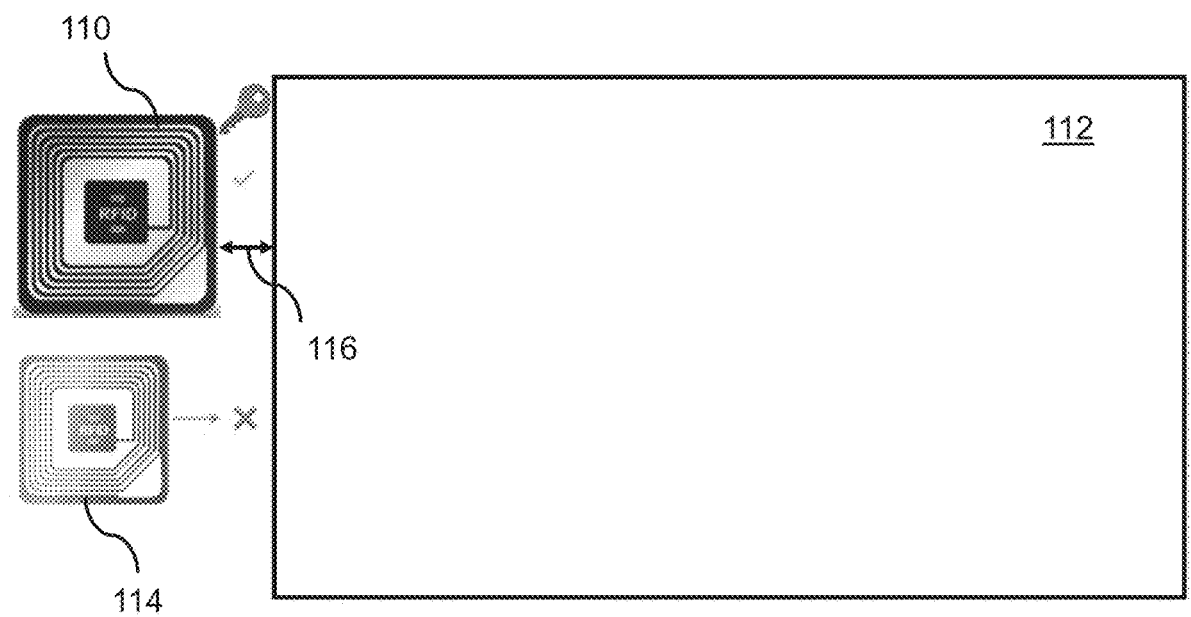
FIG. 5 illustrates an encrypted RFID tag and an RFID tag and a scanning station 504 in accordance with aspects of the present invention.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, original language shipping information 226 may not be understandable to a person using scanning station 504 (as shown in FIG. 5). Accordingly, the original language shipping information 226 is decrypted by cryptographic trust services 218 and then translated by translating component 219 within cryptographic trust services 218. For example, the action could be to translate the shipping information related to the item of RFID tag 502 from Japanese to Marathi. One function may be to output to a user interface on scanning station 504 (not shown) the shipping information in Marathi, which may additionally be provided to one or more of the nodes 204-210.

Figure 2B:
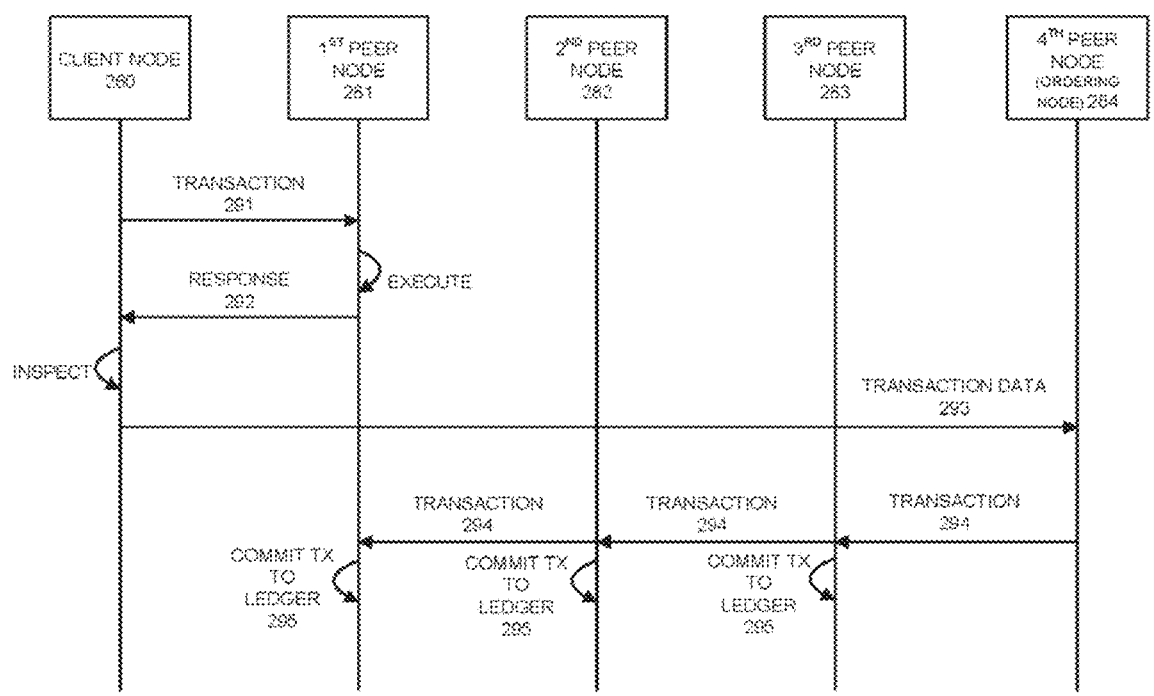
FIG. 2B illustrates an example peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260, which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
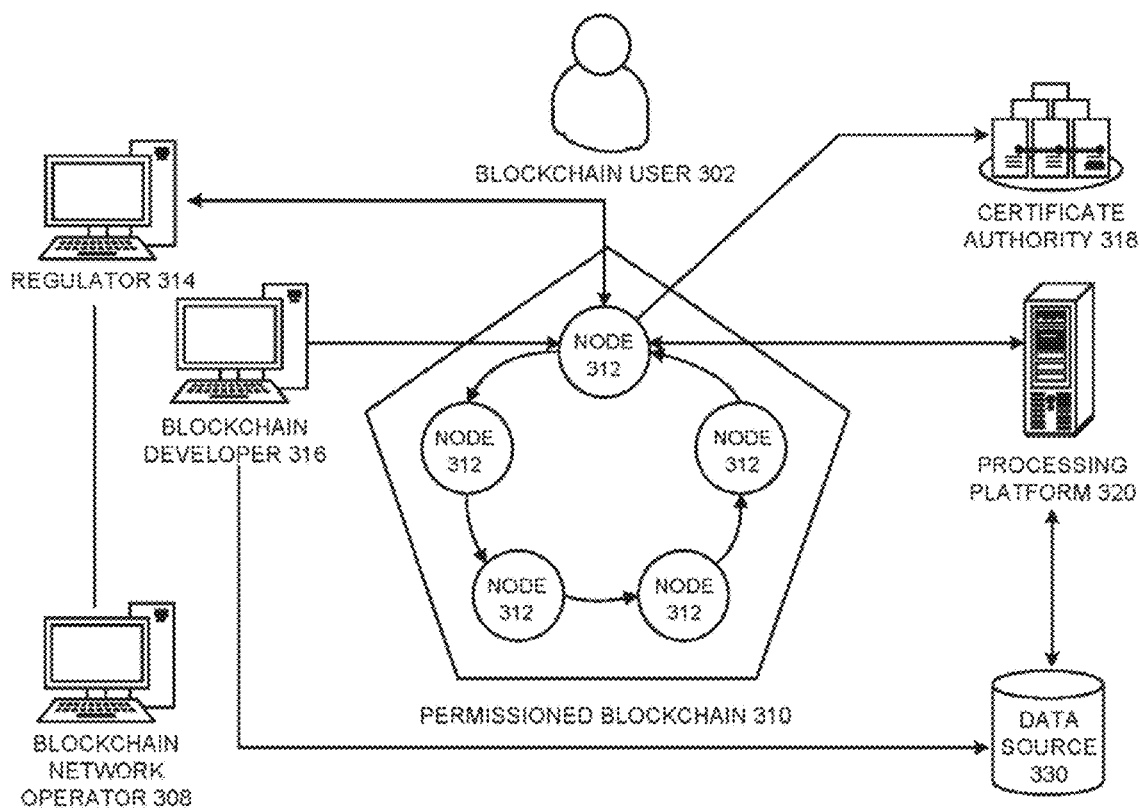
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
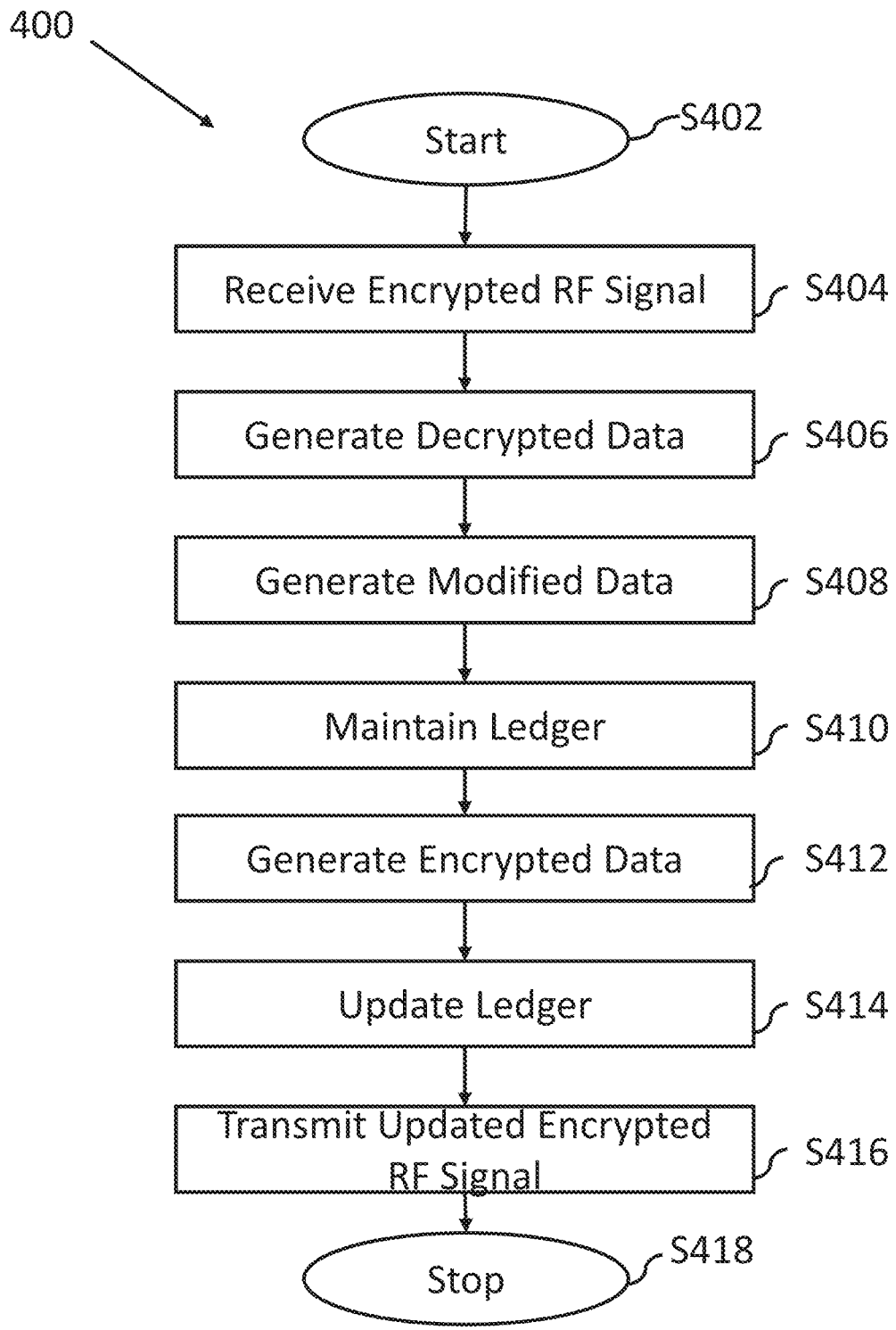
FIG. 4 illustrates a method of securely updating shipping information at a way station in accordance with aspects of the present invention.

FIG. 4 illustrates a method 400 of securely updating shipping information at a way station in accordance with aspects of the present invention.

As shown in the figure, method 400 starts (S402) and an encrypted RF signal is received (S404). This will be described in greater detail with reference to FIG. 5.

FIG. 5 illustrates an encrypted RFID tag 502 and an RFID tag and a scanning station 504 in accordance with aspects of the present invention. FIG. 5 additionally includes a conventional non-encrypted RFID tag 506 for comparison purposes.

In this example embodiment, let scanning station 504 be located at way station point 104 in Mumbai, India. Further, as discussed above with reference to FIG. 1, the item (not shown) that is associated with RFID tag 502 has been shipped from origin point 102, and is to be shipped to Barcelona, Spain at way station point 106.

While at way station point 104, scanning station 504 scans RFID tag 502 to obtain the shipping information located therein. Scanning station 504 may scan RFID tag 502 by any known scanning method, non-limiting examples of which include RF scanning. In any event, communication between RFID tag 502 and scanning station 504 is along a communication channel 508.

In accordance with aspects of the present invention, the initial scan from scanning station 504 retrieves an encrypted RF signal from RFID tag 502.

Returning to FIG. 4, after the encrypted RF signal is received (S404), decrypted data is generated (S406). In an example embodiment, method 400 includes decrypting, via a processing unit, the received encrypted RF signal to generate decrypted data. For example, returning to FIG. 5, a processing unit within scanning station 504 includes a cryptographic trust services component that decrypts the received RF signal from RFID tag 502. The received RF signal may be decrypted using a shared public key, for which scanning station 504 has been previously provided.

By decrypting the encrypted received RF signal from RFID tag 502, the cryptographic trust services component of the processing unit within scanning station 504 generates decrypted data. This decrypted data includes data associated with the item (not shown) of RFID tag 502. As mentioned previously, this data associated with the item may include item origin, item destination, item manufacturer and so on.

Returning to FIG. 4, after the decrypted data is generated (S406), modified data is generated (S408). In an example embodiment, method 400 includes modifying, via the processing unit, the decrypted data to generate modified data. For example, returning to FIG. 5, the processing unit within scanning station 504 modifies the decrypted data to generate modified data. In an example embodiment, the modified data is a translation of the decrypted data.

It is very possible however that this data associated with the item by be of the language of the item origin. In this example embodiment the language of the item origin is Japanese. For purposes of discussion, in this example, let the language of scanning station 504 at way station point 104 in Mumbai, India be Marathi.

In accordance with an aspect of the present invention, the blockchain platform of the processor of scanning station 504 includes a translator that is able to translate data from Japanese to Marathi. Now a user of scanning station 504 is able to read and verify the authenticity of the item of RFID tag 502 by reading information of the item in the local language.

Returning to FIG. 4, after the modified data is generated (S408), the ledger is maintained (S410). In an example embodiment, method 400 includes maintaining, via a memory, a cryptographic distributed ledger based on the decrypted data and the modified data. For example, returning to FIG. 5, the blockchain platform of the processor of scanning station 504 includes a cryptographic distributed ledger that includes item origin, item destination, item manufacturer and so on.

Returning to FIG. 4, after the ledger is maintained (S410), encrypted data is generated (S412). In an example embodiment, method 400 includes encrypting, via the processing unit, the modified data to generate encrypted data.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. A blockchain is a distributed database that maintains a continuously-growing list of records in the blockchain blocks, which are secured from tampering and revision due to their immutable properties. Each block contains a timestamp and a link to a previous block. A blockchain can be used to hold, track, transfer and verify information. Since a blockchain is a distributed system, before adding a transaction to the blockchain ledger, all peers need to reach a consensus status.

Returning to FIG. 5, the blockchain platform of the processor of scanning station 504 adds additional information related to way station point 104, non-limiting examples of such information includes time of arrival at way station point 104, time of departure from way station point 104, next destination (in this example, way station point 106) and final destination (in this example, way station point 108), the name of the carrier, flight number of the carrier, and so on. This additionally added information is provided in the local language, which in this example embodiment is Marathi. The additional information is encrypted, for example with a public key encryption.

Returning to FIG. 4, after the encrypted data is generated (S412), the ledger is updated (S414). In an example embodiment, method 400 includes updating, via the memory, the cryptographic distributed ledger based on the encrypted data. For example, returning to FIG. 5, the cryptographic trust services component of the processor of scanning station 504 adds the additional information related to way station point 104 to the cryptographic distributed ledger, thereby updating the ledger.

Returning to FIG. 4, after the ledger is updated (S414), an updated encrypted RF signal is transmitted (S416). In an example embodiment, method 400 includes transmitting, via the input/output interface, an updated encrypted RF signal, based on the encrypted data, to the RF identification device. For example, returning to FIG. 5, the cryptographic trust services component of the processor of scanning station 504 transmits the encrypted additional information related to way station point 104 to RFID tag 502.

Returning to FIG. 4, after the updated encrypted RF signal is transmitted (S416), method 400 stops (S418).

As shown in FIG. 5, a conventional RFID tag (or even a counterfeit RFID tag) for example as shown as RFID tag 506 will not be recognized by scanning system 504. In this manner, the swapping of an authentic item with a counterfeit item during shipping from origination point 102 to destination point 108 is prevented. The blockchain platform, with its accompanying cryptograph system enables trusted shipping.

Figure 6A:
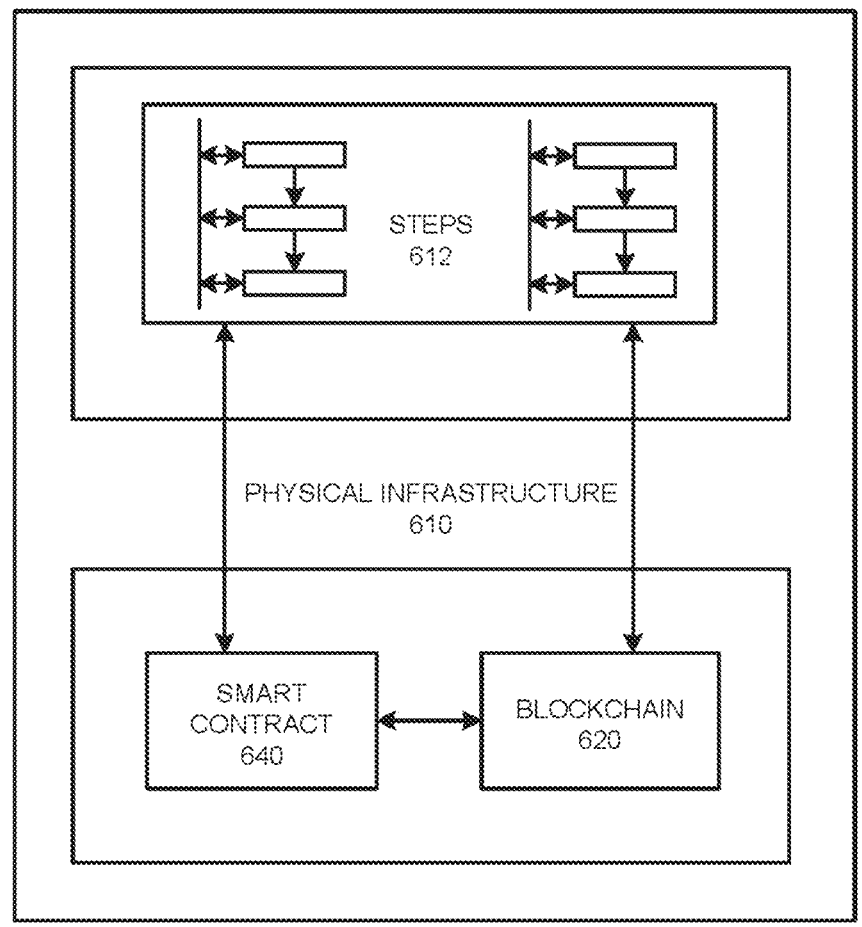
FIG. 6A illustrates an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
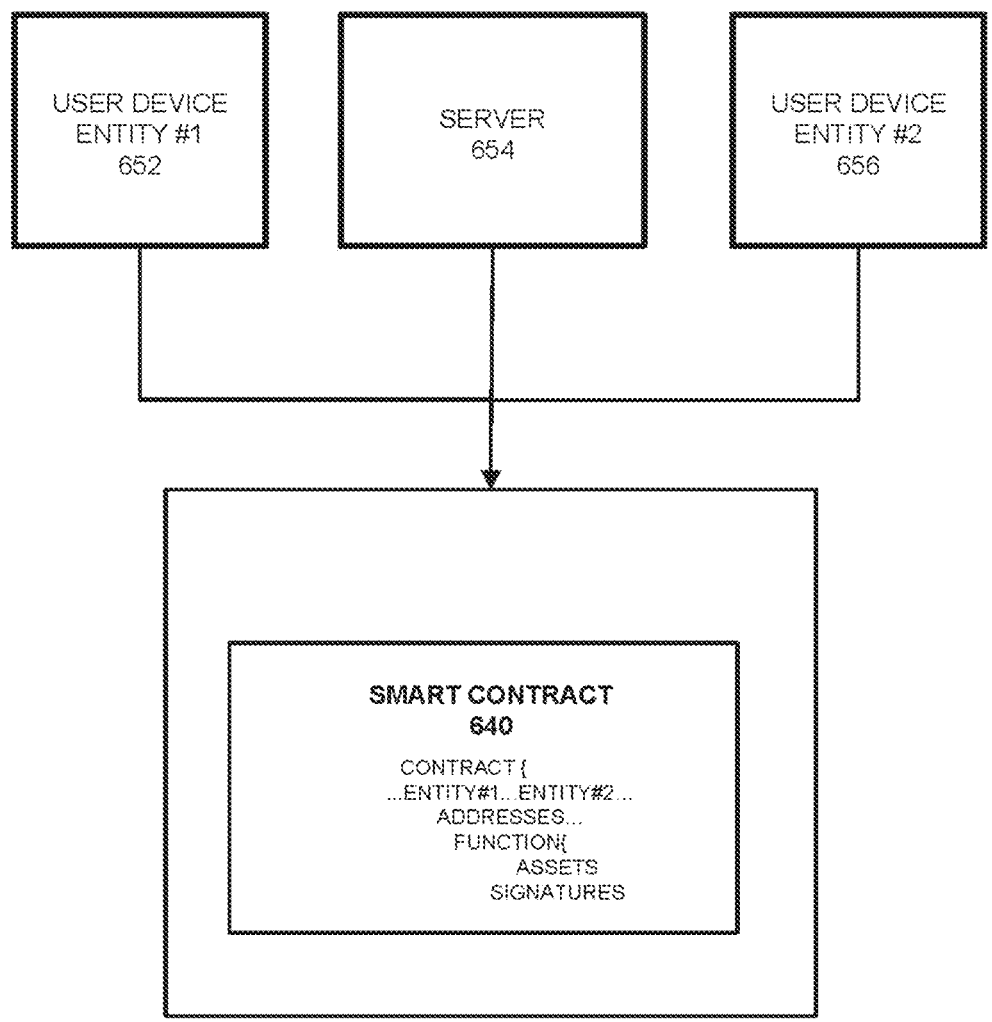
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650B may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
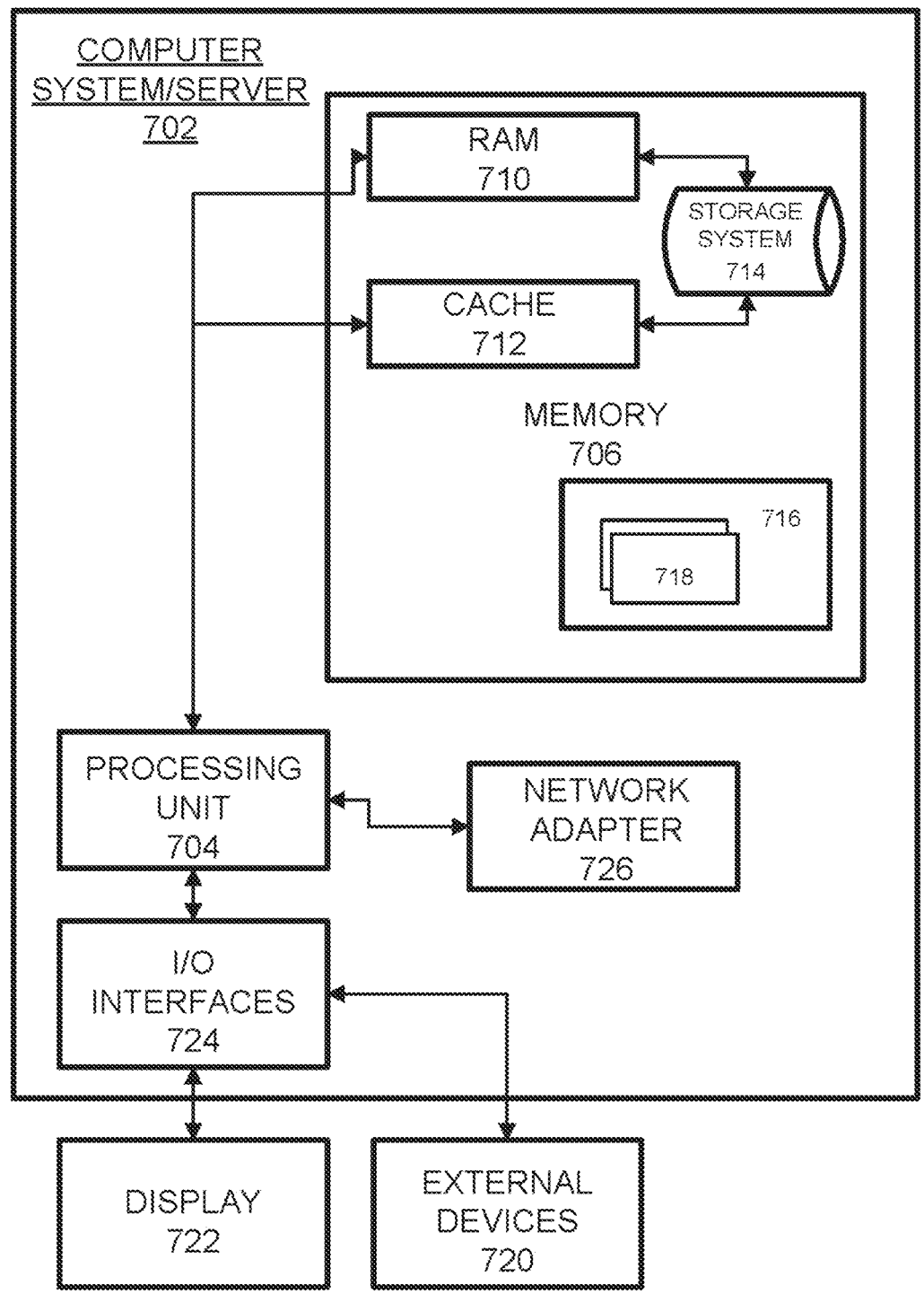
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module.

Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
    receiving, by a Secure Service Container (SSC) in a blockchain, an encrypted radio frequency (RF) signal from an RF identification device associated with an item at a current location;
    decrypting, by the SSC, the received encrypted RF signal to generate decrypted data associated with the item, where the decrypted data is in a first language associated with a previous location of the item;
    translating, by the SSC, the decrypted data from the first language to a second language associated with the current location to generate translated data;
    updating, by the SSC, the translated data to include information associated with the current location in the second language;
    encrypting, by the SSC, the updated translated data to generate encrypted data;
    updating, by the SSC, a distributed ledger of the blockchain to include the encrypted data; and
    transmitting, by the SSC, the encrypted data to the RF identification device via an updated RF signal.

2. The method of claim 1, wherein the decrypted data comprises:
    first location data corresponding to the previous location of the item, and
    first time data identifying a time that the item was located at the previous location, and
    wherein the translated data comprises:
        second location data corresponding to the current location of the item, and
        second time data identifying a time that the item was located at the current location.

3. The system of claim 2, further comprising:
    identifying, by the SSC, the current location.

4. The method of claim 1, further comprising: identifying, by the SSC, the current location.

5. A blockchain, comprising:
    a memory configured to store one or more instructions; and
    a processor of a Secure Service Container (SSC) in the blockchain that when executing the one or more instructions is configured to:
        receive an encrypted radio frequency (RF) signal from an RF identification device associated with an item at a current location;
        decrypt the received encrypted RF signal to generate decrypted data associated with the item, where the decrypted data is in a first language associated with a previous location of the item;
        translate the decrypted data from the first language to a second language associated with the current location to generate translated data;
        update the translated data to include information associated with the current location in the second language;
        encrypt the updated translated data to generate encrypted data;
        update a distributed ledger of the blockchain to include the encrypted data; and
        transmit the encrypted data to the RF identification device via an updated RF signal.

6. The blockchain of claim 5, wherein the decrypted data comprises:
    first location data corresponding to the previous location of the item, and
    first time data identifying a time that the item was located at the previous location,
    wherein the translated data comprises:
        second location data corresponding to the current location of the item, and
        second time data identifying a time that the item was located at the current location.

7. The blockchain of claim 6, wherein the processor is further configured to:
    identify the current second location.

8. The blockchain of claim 5, wherein the processor is further configured to:
    identify the current second location.

9. A non-transitory computer readable medium configured to store one or more instructions that when executed by a processor of a Secure Service Container (SSC) in a blockchain configure the processor to perform:
    receiving an encrypted radio frequency (RF) signal from an RF identification device associated with an item at a current location;
    decrypting the received encrypted RF signal to generate decrypted data associated with the item, where the decrypted data is in a first language associated with a previous location of the item;
    translating the decrypted data from the first language to a second language associated with the current location to generate translated data;
    updating the translated data to include information associated with the current location in the second language;

encrypting the updated translated data to generate encrypted data;

updating a distributed ledger of the blockchain to include the encrypted data; and transmitting the encrypted data to the RF identification device via an updated RF signal.

10. The non-transitory computer readable medium of claim 9, wherein the decrypted data comprises:

first location data corresponding to the previous location of the item, and first time data identifying a time that the item was located at the first location, and wherein the translated data comprises:

second location data identifying the current location of the item, and second time data identifying a time that the item was located at the current location.

11. The non-transitory computer readable medium of claim 10, wherein the one or more instructions further configure the processor to perform:

identifying the current second location.

12. The non-transitory computer readable medium of claim 9, wherein the one or more instructions further configure the processor to perform:

identifying the current second location.

* * * * *